US007319929B1

(12) United States Patent
Davis et al.

(10) Patent No.: US 7,319,929 B1
(45) Date of Patent: Jan. 15, 2008

(54) METHOD FOR DETECTING STEADY-STATE AND TRANSIENT AIR FLOW CONDITIONS FOR CAM-PHASED ENGINES

(75) Inventors: Ronald A. Davis, Commerce Township, MI (US); Gregory P. Matthews, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/466,880

(22) Filed: Aug. 24, 2006

(51) Int. Cl.
*G06F 19/00* (2006.01)
*F02D 41/12* (2006.01)

(52) U.S. Cl. ...................... 701/102; 123/361; 73/118.1

(58) Field of Classification Search ................ 701/102, 701/101, 114, 115; 123/361, 399; 73/118.1
See application file for complete search history.

(56) References Cited

U.S. PATENT DOCUMENTS 5,184,302 A * 2/1993 Ishida et al. ................ 701/114
5,721,375 A * 2/1998 Bidner ........................ 701/101
5,954,783 A * 9/1999 Yamaguchi et al. ........ 701/104
6,725,149 B2 * 4/2004 Wada et al. ................ 701/115

FOREIGN PATENT DOCUMENTS

JP 62-170752 A * 7/1987
JP 9-195822 A * 7/1997

* cited by examiner

*Primary Examiner*—Hieu T. Vo

(57) ABSTRACT

An air flow state determining system that determines a mass air flow into a cylinder of an engine having a cam phaser includes a first module that determines whether an air flow state is one of steady-state and transient based on a cam phaser position. A second module determines the mass air flow using one of a mass air flow sensor signal and a speed density relationship based on whether the mass air flow state is one of steady-state and transient.

16 Claims, 3 Drawing Sheets

METHOD FOR DETECTING STEADY-STATE AND TRANSIENT AIR FLOW CONDITIONS FOR CAM-PHASED ENGINES

FIELD OF THE INVENTION

The present invention relates to vehicle engine systems, and more particularly to detecting a state of air flow delivered to a cylinder of an engine.

BACKGROUND OF THE INVENTION

Engines combust a mixture of air and fuel (air/fuel) to drive a piston in a cylinder. The downward force of the piston generates torque. A throttle controls air flow delivered to the cylinders. By determining the amount of air ingested by the cylinders, the fuel mass can be calculated and a proper air/fuel mixture can be delivered to the cylinders to obtain the desired air-fuel ratio and torque.

Air flow delivered to the cylinders can be measured using a mass air flow (MAF) sensor. The MAF sensor measures the air flow across the throttle. During steady-state air flow conditions, the air flow measured across the throttle provides an accurate estimation of the fresh air flow delivered to the cylinders. Because the MAF sensor measures air flow across the throttle and not the air into the cylinders, it is most accurate during steady-state conditions, and is less accurate during transient conditions (e.g., when additional air must flow across the throttle to increase the manifold absolute pressure (MAP), or when the mass of airflow must be reduced to reduce the MAP).

Air flow can be estimated using a speed density calculation, which is typically based on MAP, engine RPM, as well as intake air temperature and pressure. The speed density calculation is only an approximation that is valid as tong none of the parameters that are not explicitly accounted for in the calculation varies. However, because the not accounted for parameters do vary over a period of time while driving the vehicle, the speed density calculations are only accurate for a short period of time and need to be adjusted over time. In order to maintain the accuracy of the speed density calculations during transient conditions, the MAF sensor is used during stead state conditions to correct speed density calculation.

In engines without variable cam phasing (VCP) or variable cam timing (VCT), if the mass of fresh air entering the cylinder changes (i.e., is transient) there is a corresponding increase or decrease in MAP. This indicates that the mass of air is either being accumulated or depleted in the intake manifold. During such transient conditions, the speed density calculation is used to determine the mass air flow entering the cylinders. The determination of whether the mass air flow is steady-state or transient can be made by means such as that described in commonly assigned U.S. Pat. No. 5,423,208, the disclosure of which is incorporated herein by reference. The control module uses the appropriate method of estimating the mass air flow into the cylinder based on the air flow state.

However in engines with VCP or VCT, changes in cam position can occur without changing the MAP while causing the MAF sensor reading to change by a large amount. This occurs because the VCP or VCT system allows varying amounts of residual exhaust gas back into the intake manifold, which replaces the fresh air mass in the manifold. As a result, more or less air flows through the throttle and the air flow is transient. Traditional air flow transient/steady-state detection methods, like that disclosed in U.S. Pat. No. 5,423,208 will see no change in MAP and incorrectly determine that the air flow is steady-state.

SUMMARY OF THE INVENTION

Accordingly, the present invention provides an air flow state determining system that determines a mass air flow into a cylinder of an engine having a cam phaser. The system includes a first module that determines whether an air flow state is one of steady-state and transient based on a cam phaser position. A second module determines the mass air flow using one of a mass air flow sensor signal and a speed density relationship based on whether the mass air flow state is one of steady-state and transient.

In other features, the system further includes a third module that processes the cam phaser position using a first order linear model and calculates an updated intermediate value based on a cam phaser position. The air flow state corresponding to cam phaser motion is determined based on the updated intermediate value. The air flow state is determined based on a difference between the updated intermediate value and a previous intermediate value.

In another feature, the system further includes a filter module that filters the cam phaser position.

In yet other features, the system further includes a deadband module that adjusts the cam phaser position based on a calibrated offset. The system further includes a minimizing module that minimizes the cam phaser position to zero if the adjustment results in the cam phaser position being less than zero.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
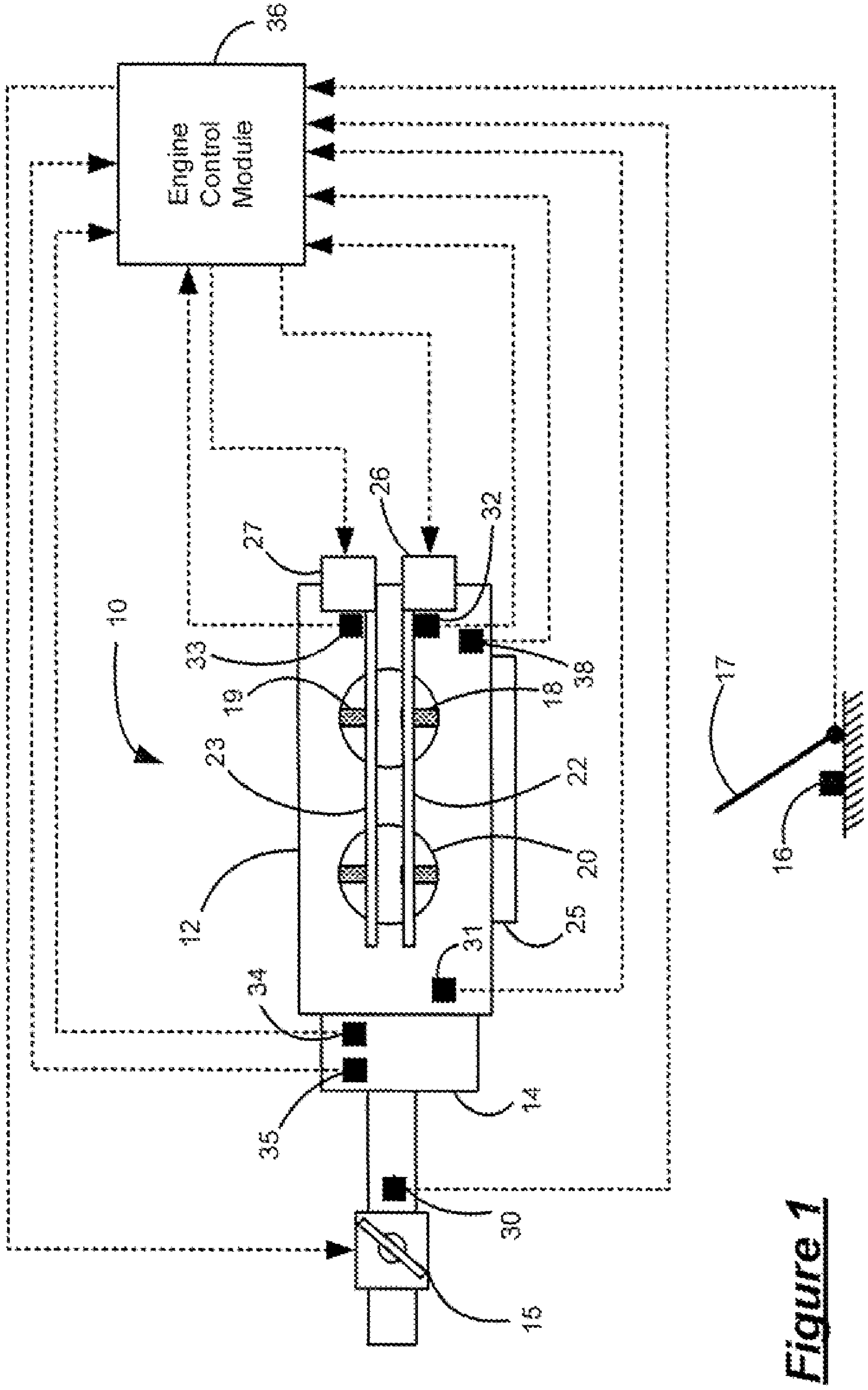
FIG. 1 is a functional block diagram of an engine system regulating using the air flow state detection control in accordance with the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit and/or other suitable components that provide the described functionality.

Referring now to FIG. 1, an engine system 10 is schematically illustrated. The engine system 10 includes an engine 12 that combusts an air and fuel (air/fuel) mixture to produce drive torque. Air is drawn into an intake manifold 14 through a throttle 15. The throttle 15 regulates mass air flow (MAF) into the intake manifold 14. The position of the throttle 15 is adjusted based on a signal from a pedal position sensor 16 indicative of a position of an accelerator pedal 17. Air is drawn into a cylinder 20 of the engine through an intake valve 18. Although four cylinders 20 are illustrated, it can be appreciated that the engine system 10 can include, but is not limited to, 2, 3, 4, 5, 6, 8, 10 and 12 cylinders.

The air is mixed with fuel and is combusted within the cylinder 20 to reciprocally drive a piston (not shown) within the cylinder, which rotatably drives a crankshaft 24. Exhaust is exhausted from the cylinder through an exhaust valve 19 and into an exhaust manifold 25. A fuel injector (not shown) injects the fuel that is combined with the air. The fuel injector can be an injector that is associated with an electronic or mechanical fueling system, or another system for mixing fuel with intake air. The amount of fuel injected by the fuel injector is regulated based on the mass air flow into the cylinder 20 to deliver a desired air/fuel ratio.

The opening and closing of the intake and exhaust valves 18, 19 are regulated by an intake camshaft 22 and an exhaust camshaft 23, respectively. The crankshaft 24 rotatably drives intake and exhaust camshafts 22, 23 using a chain/belt and pulley system (not shown) to regulate the timing of the opening and closing of the intake and exhaust valves 18, 19, with respect to a piston position within the cylinder 20. Although a single intake camshaft 22 and a single exhaust camshaft 23 are illustrated, it is anticipated that dual intake camshafts and dual exhaust camshafts may be used.

An intake cam phaser 26 and an exhaust cam phaser 27 vary an actuation time of the intake and exhaust camshafts 22, 23 respectively, which mechanically actuate the intake and exhaust valves 18, 19. More specifically, the rotational position of the intake and exhaust cam shafts 22, 23 can be advanced and/or retarded relative to a position of the piston within the cylinder 20 to vary the actuation time of the opening and/or closing of the inlet and/or exhaust valves 18, 19. In this manner, the timing and/or lift of the intake and the exhaust valves 18, 19 can be varied with respect to one another and/or with respect to a location of the piston within the cylinder 20.

Adjustment of the intake and exhaust camshafts 22, 23 using the intake and/or exhaust cam phasers 26, 27 can affect the MAP. For example, when the cam phasers 22, 23 are adjusted to increase air delivered to the cylinders 18, less exhaust residual flows into the intake manifold 14 displacing less fresh air mass. As a result, the mass of combustible air increases. Conversely, the intake and exhaust cam phasers 26, 27 can be adjusted to reduce air delivered to the cylinders 20, while increasing the exhaust gas residual entering the intake manifold 14. As a result, there is more air mass entering the intake manifold 14 and hence the cylinder 14.

When the intake and/or exhaust cam phasers 26, 27 remain in a constant position, the actuation timing of the intake and exhaust valves 18, 19 remains constant. As a result, steady-state air flow occurs and a constant amount of air is delivered to the cylinders 20. However, when the intake and/or exhaust cam phasers are adjusted, the actuation timing is correspondingly adjusted and the amount of air delivered into the cylinder 20 either increases or decreases. The resulting sudden change in air flow is typically referred to as an air transient. An air transient that results from a change in the camshaft position typically exists whenever the intake and/or exhaust cam phasers 26, 27 are moved from a fixed position.

The engine system 10 further includes an air flow sensor 30, an engine speed sensor 31, cam phaser position sensors 32, 33, an intake manifold air temperature sensor 34 and a MAP sensor 35. A control module 36 receives the signals generated by the various sensor and regulates operation of the engine system 10 based on the air flow state detection system of the present invention. The air flow sensor 30 measures an amount of air flowing through throttle 15 and the engine speed sensor 31 is responsive to the rotational speed of the engine 12. The intake manifold temperature sensor 34 measures an air temperature within the intake manifold 14 and the MAP sensor 35 measures the MAP within the intake manifold 14.

The cam phaser position sensors 32, 33 are coupled to the intake cam phaser 26 and the exhaust cam phaser 27, respectively, and are responsive their respective rotational positions. When the rotational position of the intake and the exhaust cam phasers 26, 27 is adjusted, the cam phaser rotational sensors 32, 33 output a position signal to the control module 36. The position signals can be filtered prior to being received by or within the control module 36 using a first order lag filter to remove any high frequency noise that may exist.

Airflow transients can occur due to changes that a traditional air flow transient/steady state detector can detect as well as changes in the cam phaser 26,27 position, which the traditional transient/steady state detector does not detect. Accordingly, the air flow state detection control of the present invention detects whether the mass air flow is in a steady-state or a transient state based on a signal from a traditional transient/steady state detection control and further based on the rotational velocity of the cam phasers 26, 27. Furthermore, the control module 36 determines the mass air flow into the cylinders 20 based on whether the mass air flow is deemed steady-state or transient.

Although the air flow state detection control detects steady-state air flow and/or transient air flow based on the intake cam phaser 26 and/or the exhaust cam phaser 27 rotational velocities, the air flow state detection control will be based on the rotational velocity of the intake cam phaser 26 alone being used to detect a steady-state air flow and/or transient air flow.

At each intake reference pulse, which is based on the engine RPM sensor signal, the air flow state detection control determines the intake cam position ($\theta_{ICAM}$) based on the intake cam position sensor signal. $\theta_{ICAM}$ can be filtered using a first order lag filter (e.g., y=ay+(1−a)x). Proper selection of the filter coefficient (a) enables successful sampling as slow as every other intake reference pulse. The air flow state detection control subtracts a calibrated offset ($\theta_{THR}$) from the filtered $\theta_{ICAM}$ to remove a dead-band associated with $\theta_{ICAM}$ (i.e., a cam phaser adjustment value that does not affect MAF). If the difference is less than 0, $\theta_{ICAM}$ is set it to 0).

The air flow state detection control inputs $\theta_{ICAM}$ into a first order model, which is provided by the following equation:

$$X(k+1)=\alpha X(k)+\beta\theta_{ICAM}$$

where X is an intermediate variable, k is the current event and is incremented each intake reference event, and $\alpha$ and $\beta$ are pre-determined model or filter coefficients. $\alpha$ and $\beta$ are determined using various optimization techniques, such that the following relationship is minimized;

$$|[X(k)-X(k-1)]-MAP(k)-MAP(k-1)]$$

where MAP(k)−MAP(k−1) is the change in intake manifold pressure due to only a change in intake cam position. If the following relationship is true:

$$|X(k)-X(k-1)|>\Delta_{THR}$$

the mass air flow is transient and a transient flag is set. Otherwise, the mass air flow is steady-state and a steady-state flag is set.

If the steady-state flag is set, the control module 36 operates in a steady-state mode and estimates cylinder mass air flow based on the air flow sensor 30. If the transient flag is set, the control module 36 estimates air flow based on the speed density approach according to the following equation:

$$m_a = \frac{n_v V_d P_m}{RT_e} \quad (1)$$

where $m_a$ is mass air into the cylinder, R is the universal gas constant, $V_d$ is the displacement volume of the engine 12, $\eta_v$ is the volumetric efficiency of the engine 12, $T_i$ is the temperature of the air delivered into the intake manifold 14 and $P_m$ is the intake manifold pressure. Since R and $V_d$ are constants for a given engine, the volume of the engine 12 can be defined according to the following equation:

$$V_e = \eta_v \frac{V_d}{R} \quad (2)$$

Substituting $V_e$ into equation (1), mass of air into the cylinder 20 can be defined according to the following equation:

$$m_a = \frac{V_e}{T_i} P_m \quad (3)$$

Figure 2:
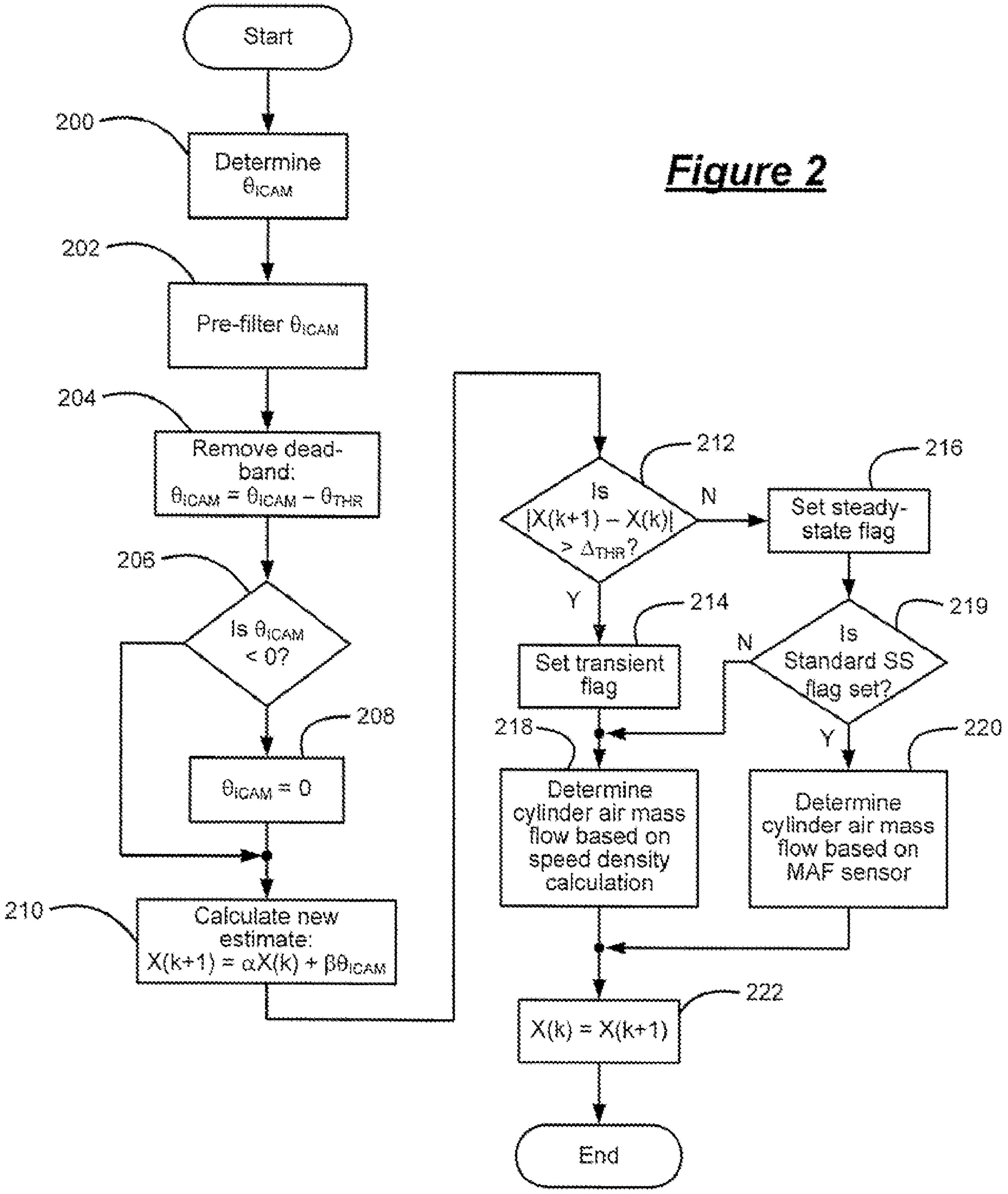
FIG. 2 is a flowchart illustrating exemplary steps executed by the air flow state detection control according to the present invention.

Referring now to FIG. 2, a flowchart illustrates exemplary steps executed by the air flow state detection control. In step 200, control determines $\theta_{ICAM}$. In step 202, control filters $\theta_{ICAM}$ to provide a filtered $\theta_{ICAM}$. In step 204, control subtracts $\theta_{THR}$ from $\theta_{ICAM}$ to remove the dead-band around the parked position. Control determines whether $\theta_{ICAM}$ is less than zero in step 206. If $\theta_{ICAM}$, is less than zero, control continues in step 208. If $\theta_{ICAM}$, is not less than zero, control continues in step 210. In step 208, control sets $\theta_{ICAM}$ to Zero.

Control updates the intermediate variable X(k+1) in step 210. In step 212, control determines whether the absolute value of the difference between X(k+1) and X(k) is greater than $\Delta_{THR}$. If the absolute value of the difference between X(k+1) and X(k) is greater than $\Delta_{THR}$, control continues in step 214. If the absolute value of the difference between X(k+1) and X(k) is not greater than $\Delta_{THR}$, control continues in step 216. In step 214, control sets the transient flag and estimates the cylinder mass air flow using the speed density approach in step 218. In step 216, sets the steady-state flag. In step 219, control determines whether the traditional or standard transient/steady state detection control has indicated that the air flow is steady state (SS) by setting a SS flag. If the SS flag is set, control estimates the cylinder mass air flow using the MAF sensor 30 in step 220. If the SS flag is not set, control continues in step 218. In step 222 control sets X(k) equal to X(k+1) and control ends.

Figure 3:
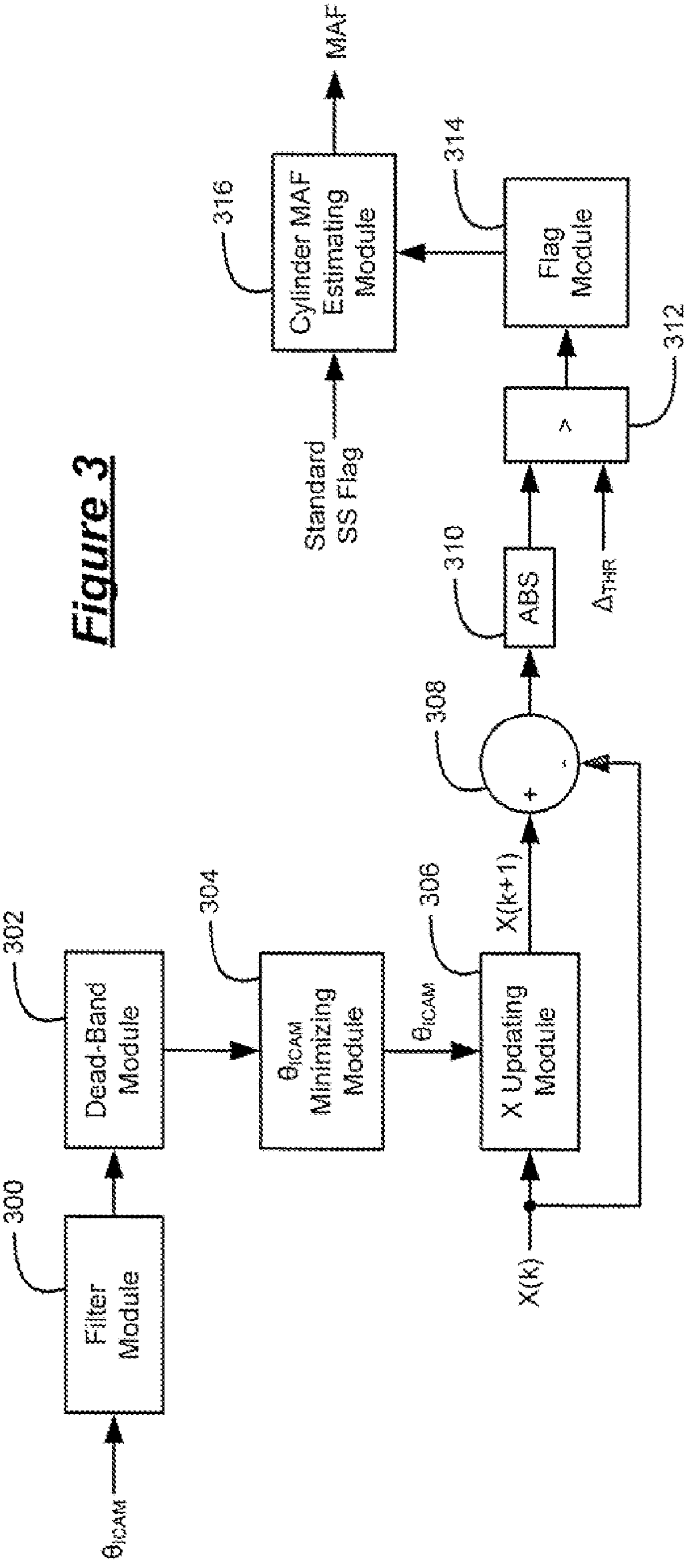
FIG. 3 is a functional block diagram of exemplary modules that execute the air flow state detection control of the present invention.

Referring now to FIG. 3, exemplary modules that execute the air flow state detection control will be described in detail. The exemplary modules include a filter module 300, a dead-band module 302, a $\theta_{ICAM}$ minimizing module 304, an X updating module 306, a summer 308, an absolute value module 310, a comparator module 312 a flag module 314 and a cylinder MAF estimating module 316. The filter module 300 and the dead-band module 302 respectively filter and remove the dead-band value from $\theta_{ICAM}$.

The $\theta_{ICAM}$ minimizing module 304 caps the minimum value of $\theta_{ICAM}$ to zero, if $\theta_{ICAM}$ is less than zero after the dead-band removal operation. The X updating module 306 determines X(k+1) based on X(k), $\theta_{ICAM}$ and the first order linear model described in detail above. The summer 308 determines the difference between X(k+1) and X(k) and the absolute value module 310 generates the absolute value of the difference.

The comparator module 312 compares the absolute value of the difference to $\Delta_{THR}$ and outputs a first signal (e.g., 1) if the difference is greater than $\Delta_{THR}$, and outputs a second signal (e.g., 0) if the difference is less than $\Delta_{THR}$. The flag module 314 sets the steady-state or transient flag based on the output of the comparator module 312. The cylinder MAF module 316 determines the cylinder MAF based on either the MAF sensor signal or the speed density calculation depending on the output of the comparator module 312 and the condition of the standard SS flag.

Those skilled in the art can now appreciate from the foregoing description that the broad teachings can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An air flow state determining system that determines a mass air flow into a cylinder of an engine having a cam phaser, comprising:

a first module that determines whether an air flow state is one of steady-state and transient based on a cam phaser position; and a second module that determines said mass air flow using one of a mass air flow sensor signal and a speed density relationship based on whether said mass air flow state is one of steady-state and transient.

2. The air flow determining system of claim 1 further comprising a third module that processes said cam phaser position using a first order linear model and calculates an updated intermediate value based on said cam phaser position, wherein said air flow state is determined based on said updated intermediate value.

3. The air flow determining system of claim 2 wherein said air flow state is determined based on a difference between said updated intermediate value and a previous intermediate value.

4. The air flow state determining system of claim 1 further comprising a filter module that filters said cam phaser position.

5. The air flow state determining system of claim 1 further comprising a dead-band module that adjusts said cam phaser position based on a calibrated offset.

6. The air flow state determining system of claim 5 further comprising a minimizing module that minimizes said cam phaser position to zero if said adjustment results in said cam phaser position being less than zero.

7. A method of determining a mass air flow into a cylinder of an engine having a cam phaser, comprising:

monitoring a cam phaser position;

determining whether an air flow state is one of steady-state and transient based on a cam phaser position; and determining said mass air flow using one of a mass air flow sensor signal and a speed density relationship based on whether said mass air flow state is one of steady-state and transient.

8. The method of claim 7 further comprising:

processing said cam phaser position using a first order linear model; and calculating an updated intermediate value based on said cam phaser position, wherein said air flow state is determined based on said updated intermediate value.

9. The method of claim 8 wherein said air flow state is determined based on a difference between said updated intermediate value and a previous intermediate value.

10. The method of claim 7 further comprising filtering said cam phaser position.

11. The method of claim 7 further comprising adjusting said cam phaser position based on a calibrated offset.

12. The method of claim 11 further comprising minimizing said cam phaser position to zero if said adjustment results in said cam phaser position being less than zero.

13. A method of determining a mass air flow into a cylinder of an engine having a cam phaser, comprising:

monitoring a cam phaser position;

filtering said cam phaser position;

processing said cam phaser position using a linear model to determine an updated intermediate variable;

determining whether an air flow state is one of steady-state and transient based on said updated intermediate variable and a previous intermediate variable; and determining said mass air flow using one of a mass air flow sensor signal and a speed density relationship based on whether said mass air flow state is one of steady-state and transient.

14. The method of claim 13 wherein said air flow state is determined based on a difference between said updated intermediate value and said previous intermediate value.

15. The method of claim 13 further comprising adjusting said cam phaser position based on a calibrated offset.

16. The method of claim 15 further comprising minimizing said cam phaser position to zero if said adjustment results in said cam phaser position being less than zero.

* * * * *